(12) United States Patent
Russ et al.

(10) Patent No.: US 8,282,353 B2
(45) Date of Patent: Oct. 9, 2012

(54) BEARING UNIT FOR A LONG ROTOR BLADE OF A WIND POWER INSTALLATION, WIND POWER INSTALLATION COMPRISING ONE SUCH ROTOR BLADE BEARING ARRANGEMENT, AND METHOD FOR OPERATING ONE SUCH WIND POWER INSTALLATION

(75) Inventors: Erich Russ, Gremsdorf (DE); Werner Schröppel, Wendelstein (DE)

(73) Assignee: IMO Holding GmbH (DE)

( * ) Notice: Subject to any disclaimer, the term of this patent is extended or adjusted under 35 U.S.C. 154(b) by 870 days.

(21) Appl. No.: 11/921,710

(22) PCT Filed: Jun. 6, 2006

(86) PCT No.: PCT/EP2006/005362
§ 371 (c)(1),
(2), (4) Date: Feb. 17, 2009

(87) PCT Pub. No.: WO2006/131301
PCT Pub. Date: Dec. 14, 2006

(65) Prior Publication Data
US 2009/0175724 A1    Jul. 9, 2009

(30) Foreign Application Priority Data

Jun. 6, 2005  (DE) .......................... 10 2005 026 141

(51) Int. Cl.
*B63H 1/24* (2006.01)
(52) U.S. Cl. .................................... 416/131; 416/132 B
(58) Field of Classification Search .................. 416/131, 416/132 B, 135, 136, 205; 415/170.1, 174.1
See application file for complete search history.

(56) References Cited

U.S. PATENT DOCUMENTS 3,652,141 A  *  3/1972  Husten et al. ................ 384/455
(Continued)

FOREIGN PATENT DOCUMENTS

DE            2011141            9/1971
(Continued)

*Primary Examiner* — Zandra Smith
*Assistant Examiner* — Ali Naraghi
(74) *Attorney, Agent, or Firm* — Pandiscio & Pandiscio

(57) ABSTRACT

The invention relates to a bearing unit for a long rotor blade, especially a wind power installation, said bearing unit comprising two annular elements that can be rotated in relation to each other and are directly or indirectly connected to the rotor blade hub and to the rotor blade, and at least two running tracks that can be axially staggered in relation to each other and comprise peripheral rolling bodies with an approximately cylindrical shape, i.e. each comprising a lateral surface that is rotationally symmetrical to a rotational axis in a very precise manner. The aim of the invention is to be able to fully absorb the tipping moment caused by the wind pressure on the rotor blade and on the bearing unit, and optionally to absorb other forces and other moments. To this end, two running tracks are arranged between the two connection elements, are axially staggered in relation to each other, and comprise rolling bodies with an approximately cylindrical shape, said rolling bodies being oriented in such a way that the rotational axes thereof intersect the longitudinal axis of the rotor blade in question at an angle of between 30° and 90°. The invention also rates to a wind power installation provided with one such rotor blade bearing arrangement, and to a method for operating one such wind power installation. The at least one rotor blade in question is continuously rotted about the longitudinal axis thereof during the option of the wind power installation.

36 Claims, 4 Drawing Sheets

U.S. PATENT DOCUMENTS

| | | | |
|---|---|---|---|
| 4,789,254 A | 12/1988 | Marquardt et al. | |
| 6,991,378 B2 * | 1/2006 | Jacquemont et al. | 384/471 |
| 2003/0116970 A1 | 6/2003 | Weltkamp et al. | |
| 2004/0240997 A1 * | 12/2004 | Wobben | 416/132 B |
| 2006/0220389 A1 | 10/2006 | Shibata et al. | |

FOREIGN PATENT DOCUMENTS

| | | |
|---|---|---|
| DE | 2648144 | 4/1978 |
| DE | 3732730 | 4/1989 |
| DE | 19739164 | 3/1999 |
| EP | 1259741 | 11/2002 |

* cited by examiner

BEARING UNIT FOR A LONG ROTOR BLADE OF A WIND POWER INSTALLATION, WIND POWER INSTALLATION COMPRISING ONE SUCH ROTOR BLADE BEARING ARRANGEMENT, AND METHOD FOR OPERATING ONE SUCH WIND POWER INSTALLATION

The invention is directed to a bearing unit for an elongated rotor blade, particularly of a wind power plant, comprising at least two mutually axially offset raceways with circulating rolling bodies; further, to a wind power plant equipped with such a rotor blade bearing and to a method for operating such a wind power plant.

Wind power plants—and thus their rotor diameters, in particular—are becoming ever larger. Strain on all the structural and bearing units is increasing accordingly. This includes the blade bearings, which serve to adjust the blade setting angle and make it possible to adapt to different wind velocities, both for optimum power control and as a storm wind shutoff. The highest load, in this connection, is the overturning moment, which passes the wind load concentrated at the center of the wind pressure (the center of pressure, $C_p$, roughly at the center of the length of the rotor blade) along to the blade bearing. The blade bearings must be considered the fulcrums with regard to this overturning moment, and due to the considerable lever arm, the wind load causes very high bending stress on the blade root and the blade bearing. The bending moments on the blade bearings thus are much heavier than on the bearings for the rotor as a whole, since there the bending moments generated by the rotor blades, which are mounted offset from each other by the same rotational angle, largely balance each other out. In addition, the rotor of a wind power plant rotates constantly during torque induction, so the rolling bodies there are also in motion and there is no risk of prolonged exposure to local stress, in contrast to the rotor blade bearings, which are usually rotated only to adjust the setting angle of the rotor blades when the mean wind force changes appreciably, i.e., fairly seldom.

[Stamp:] CONFIRMATION COPY

DE 37 32 730 A1 shows a lifting flange bearing for the rotor blades of wind power plants. One embodiment discloses two bearing units spaced apart from each other in the axial direction relative to the axis of rotation, each consisting of an angular-contact spherical plain bearing, a cylindrical roller bearing and a needle bearing, it being the case that the cylindrical roller bearing transmits radial forces and the needle bearing axial forces from an external ring unit to the outer ring of the angular-contact spherical plain bearing, whose inner ring passes these forces collectively along to the hub. To control the considerable overturning moments caused by the wind load, two bearing units are provided. Since each bearing unit of this kind comprises an axial bearing and a radial bearing, every overturning moment or root bending moment caused by the wind load induces a pair of mutually opposed radial forces (one radial force on each radial bearing) and a pair of mutually opposed axial forces (one on each axial bearing). Since—due to the geometric distances between the bearings—the overturning moment or root bending moment distributes forces of a comparable order of magnitude to all four bearing points, all the radial and axial bearings must be designed for comparably high loads. To reduce these loads to an acceptable level, a minimum distance has to be maintained between the two bearing units, which makes it necessary to separate them. However, the use of two bearing units with a total of four bearing points, all designed for high stresses, requires increased design expenditure, especially since each of the bearings has to have a separate inner and outer ring for the raceway.

From the disadvantages of the described prior art comes the problem initiating the invention, that of creating a rotor blade bearing for wind power plants that can lastingly meet the particular demands imposed on such components, especially the much higher overturning moment under severe wind loads than that exerted on the rotor bearings, for example, and can withstand the relatively severe load conditions.

This problem is solved, in a rotor blade bearing unit of this kind, by means of two oppositely rotatable, annular elements for indirect or direct connection to the rotor blade hub on the one side and to a rotor blade on the other side; wherein the rolling bodies of two mutually axially offset raceways have a roughly cylindrical shape, i.e., having in each case a lateral surface that is rotationally symmetrical to exactly one axis of rotation (a cylindrical, conical, needle or barrel shape); and wherein two mutually axially offset raceways disposed between the two connecting elements and comprising circulating rolling bodies of roughly cylindrical shape serve to completely absorb the overturning moment caused by the wind pressure on the rotor blade and acting on the bearing unit (and, where appropriate, to absorb additional forces such as blade weight, centrifugal force, etc., and/or torques, for example due to a rotor blade at times being in an inclined position relative to the vertical), said rolling bodies being aligned such that their axes of rotation intersect the longitudinal axis of the respective rotor blade at an angle of between 45° and 90°.

The term "roughly cylindrical shape" here is not intended to be limited to the pure, mathematically defined cylindrical shape, but rather to encompass all solids of revolution having, in each case, a lateral surface and two end faces differentiable therefrom by a respective edge or region with a reduced radius of curvature, i.e., for example, a cylindrical, conical, needle or barrel shape, but not spheres, which have a constant radius of curvature everywhere, so a lateral surface cannot be differentiated from end faces and no axis of rotation is apparent in comparison to other axes or directions. The orientation of the longitudinal axes of these rolling bodies takes into account the force ratios on a rotor blade, in which—as explained in more detail below—axial forces predominate over radial forces. The two raceway pairs for the rolling bodies are so arranged adjacent the two oppositely rotatable connecting elements that such a row of rolling bodies can effectively transmit axial pressure forces in one direction and the other, equivalent pressure forces diametrically oppositely and in the opposite direction along the common axis of rotation. The philosophy on which this arrangement is based is that a rotor blade also has a not inconsiderable diameter of, for example, 2 m to 3 m, it being the case that the fulcrums on the blade bearing for the overturning moment caused by the wind load are located approximately on a line extending through the central longitudinal axis of the rotor blade and transversely to the rotor axis. Thus, it is not necessary to provide two radial bearings in addition. Moreover, the high overturning moment initiated by the wind results in a bending moment on the root of the rotor blade about these fulcrums or about the line connecting them, which are [plural sic] manifested as axial tensile forces on the regions of the blade bearing that are offset 90° from the line defining the fulcrums, and thus as axial pressure forces on the opposite side. These axial forces are absorbed by the two bearing points according to the invention. The overturning moment produced by the wind pressure is counteracted solely by a pair of axial forces. Radial forces that would expand the bearing rings radially and make sealing difficult are prevented. This advantage is due precisely to the fact that no pair of radial bearings is present. The invention further makes it possible to dispense with angular-contact spherical plain bearings on the blade bearings, which are seldom reinforced and thus are very unfavorable from a load design standpoint. In addition, no axle journal is necessary. Since the overturning moment is fully counteracted by the pair of axial forces, a second bearing unit is unnecessary here, thereby considerably reducing the number of parts and thus also the sensitivity of the bearing unit; the construction is extremely compact, and there is no need for the mutual? adjustment of multiple bearing points.

It is within the scope of the invention that the rolling bodies of two mutually axially offset raceways are aligned such that their axes of rotation extend approximately radially, i.e., approximately perpendicularly, to the longitudinal axis of the particular rotor blade. In such a case, no radial forces whatsoever are transmitted by the rolling bodies of these two raceways. For purposes of centering the rotor blade, an additional raceway can be provided—as described in more detail below—for rolling bodies acting against radial forces. This results in force ratios that are more straightforward and easier to control.

Arranging the two connecting elements concentrically one inside the other provides space to fit both of the two mutually axially offset bearing points between the connecting elements.

It has proven beneficial for each of the two connecting elements to comprise coronally arranged fastening bores. These can be threaded blind bores or preferably continuous bores, for screws, bolts or the like that are screwed into a rotor blade or the rotor hub or are anchored thereto.

Mutually oppositely facing end faces of the annular connecting elements preferably serve as connecting surfaces to the rotor blade hub, on the one side, and to the particular rotor blade, on the other side. The bearing unit can thus be interposed between these two components.

If the annular gap between the two connecting elements is sealed in the region of the particular two connecting surfaces, then the rolling bodies travel in a space that is completely sealed against the environment. The rolling bodies are thereby removed from the effect of, for example, salt-laden and therefore corrosive sea air, the ingress of dust is prevented, and the grease or other lubricant is kept in the region of the rolling bodies.

Further advantages are obtained by providing at least one projecting, circumambient flange on at least one connecting element, on that side of the lateral surface thereof that faces toward the other connecting element. An axial force can be introduced into the particular connecting element via the side faces of this flange.

Taking this inventive idea further, it can also be provided that the axial extent of the flange is the same as the axial distance between the rolling bodies of the two bearings. In this way, it is possible to use or configure the two annular side faces of the flange as a running surface for the roughly cylindrical rolling body of a respective bearing point.

The invention can be improved by having the raceways for the roughly cylindrical rolling bodies extend along roughly planar annular surfaces that are intersected roughly perpendicularly by the longitudinal axis of the particular rotor blade. Planar surfaces are easier to make than curved surfaces, from a production engineering standpoint; moreover, according to the invention only axial forces are transmitted by the bearings concerned, so there is no reason to provide the running surfaces with a curvature or to implement them at a (high) angle, for example on the order of about 45°, to the longitudinal axis of the particular rotor blade, as is the case, for example, with double angular-contact rolling bearings.

The inventive bearing preferably comprises at least one third bearing point, which is interposed between two mutually confronting lateral surfaces of the two connecting elements. In contrast to the previously described bearings, this third bearing point has the task of transmitting the wind pressure also associated with the wind load from the particular rotor blade to the rotor hub. The stress placed on the bearing by the force of the wind itself is, of course, significantly smaller than the stress due to the overturning moment caused by the wind load, but it cannot be neglected, all the same, since the inventive bearing comprising roughly cylindrical rolling bodies cannot transmit any radial forces. The additional bearing serves this purpose instead.

The invention prefers an arrangement in which the third bearing point is disposed between the two raceways for roughly cylindrical rolling bodies, which are aligned such that their axes of rotation are oriented approximately radially to the longitudinal axis of the particular rotor blade.

The result is a very space-saving mode of construction, in that the third or additional bearing point is placed between the first two in the axial direction, particularly in the region of a flange between the first two bearings.

To ensure the smoothest possible adjustment of the rotor blade, the third bearing point can also be configured as a rolling bearing with the axes of rotation of its rolling bodies roughly parallel to the longitudinal axis of the rotor blade. Since, moreover, the forces to be transmitted by the third bearing are smaller than the initially described forces transmitted by the first two, a rolling body of the third bearing can have a smaller volume than a rolling body of one of the bearings comprising rolling bodies whose axes of rotation are oriented approximately radially to the longitudinal axis of the rotor blade.

By the same token, it is also possible to configure the third bearing point as a sliding bearing. Since this bearing is subjected only to comparatively small forces, no large frictional forces are generated in it, either.

A further consequence of the lower stress on the third or additional bearing point is that the effective width of the raceway or sliding surface of a bearing point interposed between two mutually confronting lateral surfaces of the two connecting elements can be dimensioned as smaller than the effective width of a raceway that is in contact with a rolling body whose axis of rotation is oriented approximately radially to the longitudinal axis of the particular rotor blade.

To facilitate the assembly of the two annular connecting elements, along with the rolling bodies disposed between them and any spacers or rolling-body cages, the invention recommends implementing a connecting element as divided along a plane oriented roughly perpendicular to the longitudinal axis of the rotor blade, so that the two halves can be taken apart in order to seat the rolling bodies.

So that the rolling bodies are aligned in parallel in such a way that they jam in the raceways as little as possible even when they are under load, the cross section of the raceways provided for seating the rolling bodies can be shaped such that it at least regionally does not match the longitudinal section of a rolling body to be seated in it, but is preferably narrower in the axial direction and thus is biased against the rolling bodies. If the raceway then widens—on the one hand, under the influence of the rolling body itself, but on the other hand also under load—it is nevertheless in form-locking contact with the rolling bodies, so they cannot jam. For this purpose, the axial extent of the respective cross sections of the raceways in which the rolling bodies are to be seated can be selected as at least regionally smaller than the diameter of the corresponding portion of a rolling body.

To increase the life of the inventive bearing, the rolling bodies whose axes of rotation are directed approximately radially to the longitudinal axis of the respective rotor blade should have at least one cambered transitional region between the lateral surface and at least one adjacent end face, i.e., a flattening or rounding. The pressing of an edge against the raceway due to elastic deformation of the bearing unit during operation is thereby tolerated, while at the same time a sufficient area of contact with the running surfaces is ensured for this case in the region of the rounded transition.

Another measure for reducing wear in the inventive bearing is for the rolling bodies whose axes of rotation are directed approximately radially to the longitudinal axis of the particular rotor blade to comprise at least one dome-shaped end face. This increases the sliding area, in that the radially outwardly disposed end faces of a rolling body slide along the inner face of the adjacent connecting element and are therefore subject to only a small amount of wear. With this in mind, it is advantageous if the radius of curvature of the dome-shaped end face is approximately the same as, or smaller than, the radius of the inner face of the outer ring.

Wear is also reduced by increasing the elasticity of the rolling bodies, since they will then yield elastically, at least to a limited extent, under high stress and thus high elastic deformation of the bearing unit, and will subsequently spring back without residual deformation. The elasticity is increased for example by configuring the rolling bodies whose axes of rotation are directed approximately radially to the longitudinal axis of the respective rotor blade as hollow bodies. This can be done, for example, by boring through them coaxially along their axes of rotation. The elasticity can be precisely adjusted according to the thickness of the bore or of the remaining lateral surface.

Such hollow spaces can be used to bring adjacent hollow rolling bodies together by means of end-face connecting elements and thus to keep them at a defined spacing, by having these connecting elements engage at least regionally in the hollow spaces of the rolling bodies. In the simplest case, they can, for example, have the shape of C-shaped brackets, each of whose ends engages in a respective central or coaxial bore in two adjacent roller-shaped or approximately cylindrical rolling bodies.

Such connecting elements, in turn, afford the possibility of being fastened together to form one or more cages or cage segments. Such cage segments extend, for example, only over a limited center angle and not over the entire circumference of a row of rolling bodies, and/or they embrace the rolling bodies at their inwardly or outwardly disposed end faces or at both ends.

Alternatively thereto, a spacer whose radial longitudinal section is smaller than or exactly the same size as the radial longitudinal section of a rolling body can be interposed between adjacent rolling bodies. In this case, the rolling bodies themselves can each be configured as longer and thus with a maximum volume, so that higher forces can be transmitted, since no space is lost to a cage in a predefined installation space.

In the context of a first embodiment of the invention, no teeth are provided on any of the connecting elements; in such a case, the adjustment of the rotor blades can be performed for example by means of a hydraulic cylinder, which is linked to the rotor blade eccentrically to its longitudinal axis and is supported by the rotor hub or vice versa.

Conversely, for purposes of rotor blade adjustment, teeth can be provided on a connecting element, preferably on the inner face of the inner ring, to engage a toothed driven element of a drive motor, for example of a pinion.

A wind power plant equipped with at least one rotor blade bearing system according to the invention provides a number of advantages. The high axial forces characteristically imposed on rotor blades of wind power plants stress the rotor blade bearing system very heavily and can be transmitted much better by cylindrical, conical, needle-shaped or barrel-shaped rolling bodies having linear regions of contact with the raceways than by spherical rolling bodies with punctiform regions of contact with the raceways. The high axial forces are due primarily to the immense length of the rotor blades, which at the highest point of their rotational path are many meters above the top of the tower, in contrast to, for example, ship's propellers operating in water, which have a very small radial extent and furthermore are subjected to a considerable radial suction effect due to their usually being arranged in pairs. Such a radial force does not occur in wind power plants, where only a single rotor per tower is normally provided. On the other hand, with increasing elevation of a wind power plant above sea level, the wind forces can sometimes reach extremely high velocities of up to several 100 km/h, for example during a storm, a hurricane or even a cyclone, leading to extremely high axial loads on the rotor blade bearings that must be taken into account in the design. Such flow velocities and, above all, the attendant discontinuities—gusts, eddies, etc.—are utterly inconceivable in other media, for example water, so this problem does not even present itself in those environments.

The method according to the invention for operating a wind power plant comprising at least one rotor blade bearing unit is characterized in that during the operation of the wind power plant, the rotor blade(s) concerned is/are rotated constantly, hence even when a steady wind velocity eliminates the need to adjust the blades.

A constant, i.e. uninterrupted (small) rotation of the rotor blades assists the inventive rotor blade bearing system, in that the lubricant film between the rolling bodies and the raceways can regenerate itself constantly, thus averting intermittent dry operation. This is true in particular in the case where, under steady wind conditions, the blade adjustment angle changes very little and the blade bearings therefore remain in one position. Even with such a quasi-constant blade adjustment angle, detrimental wear on the raceways can still occur in the blade bearings, since as the rotor blade moves past the tower, an overturning moment load is exerted on the stationary (non-rotating) blade bearings due to aerodynamic suction and pressure, and without the inventive method would remove the lubricant film from between the rolling bodies and the raceway, and damage to the raceways would ensue as a result of what is known as "false brinelling," i.e., degeneration of the raceway due to high Hertzian pressing of the rolling bodies onto the raceway(s) by the repeated exertion of alternating loads on the rolling body, which quickly lead to expulsion of the lubricant film when the rolling body is standing still.

This "false brinelling" occurs when the wind power plant is shut down for any reason, e.g. for maintenance or repair work or during a storm wind phase, and the rotor, with the blades, slowly turns freely ("freewheeling") without generating electrical energy. In this case, as well, the use of the inventive method during the downtime of the wind power plant can avert or prevent raceway damage due to false brinelling.

A further advantage of the inventive method is the prevention of raceway wear due to what is known as "fretting corrosion." This occurs due to elastic deformation of the bearing unit/its connecting structure and a frequently resulting sliding movement of the rolling bodies in the direction of their longitudinal axis, and thus along the raceway. The inventive method still ensures a rolling movement of the rolling bodies, and thus build-up of the necessary lubricant film between the rolling bodies and the running surfaces, even when the rolling bodies are subject to unfavorable sliding movements along their longitudinal axes, specifically regardless of whether or not the wind power plant is operating and whether or not the rotor blades have to be adjusted, for such time as constant, i.e. uninterrupted (minor) adjustment of the rotor blades is advantageously being performed.

The constant rotation is brought about by suitable control of the motor or cylinder used to adjust the rotor blades. One option here is to impart a periodic motion to serve as the constant rotation, since the resulting oscillating motion of a rotor blade causes a particularly favorable build-up of lubricant between the rolling bodies and the raceways.

The invention can be optimized by having the period of the oscillating rotation of the rotor blade correspond to the period of revolution of the wind wheel as long as the latter is below a set lower limit. This causes the loads imparted by the different rotor blades to cancel each other out, so as to minimize the resulting structural load.

On the other hand, the periodic motion is to continue, particularly with a roughly constant period, when the wind wheel is standing still (for example during slack periods), but also when the period of revolution of the wind wheel is below a set lower limit. In the lower rotation speed range of the wind wheel, this may cause the periodic adjustment to be decoupled from the rotation speed of the wind wheel, for example in such a way that this value never falls below a lowermost adjustment frequency. When the wind wheel is powering up, this lowermost adjustment frequency can, under some circumstances, be maintained until an angular position is finally obtained that is synchronous with the angular position of the wind wheel, so that the setting angle can subsequently be adjusted to this angular position of the wind wheel.

During the periodic rotation of a rotor blade, its setting angle oscillates between two extreme values. Reciprocal compensation for different deflections of the various rotor blades can be achieved if the maxima of the deflections of the periodic setting angle for all the rotor blades are adjusted in each case to a predefined rotational angle of the particular rotor blade about the rotor axis. Such an approximately sinusoidal deflection causes, for example in the case of three rotor blades, the periodic deviations of adjacent rotor blades from the mean to differ from each other at each instant by 120°, or generally, i.e., assuming n rotor blades, by 360°/n.

Very good results can be achieved if the extremes of the deflection of the periodic setting angle are reached at roughly the highest and lowest points of the rotor blade. This being the case, the setting angle of the rotor blade at the highest point should correspond to a higher wind strength, and at the lowest point to a reduced wind strength. This is because the wind strength is naturally greater with increasing height than it is near the ground.

An optimization of the individual blade setting angle is achieved if the amplitude of the periodic deflection of the rotor blade setting angle depends on, for example is roughly proportional to, the wind velocity, which increases with increasing height. With control of this kind, care should be taken that the amplitude of the deflection does not fall below a lower limit, even when the wind velocity or the difference between the wind velocity in the upper and lower regions of the wind wheel approaches zero (in an absolute calm, for example).

Finally, it corresponds to the teaching of the invention that the mean between the extreme values of the rotation depends on the wind velocity. As heretofore, the purpose here is for the mean value of the rotor blade setting angle to represent optimum adaptation of the rotor blade position to actual wind conditions. Preferably choosing as the mean value the rotor blade setting angle that has been statically adjusted so far results in ideal conditions for each individual rotor blade.

Additional features, characteristics, advantages and effects based on the invention will emerge from the following description of some preferred embodiments of the invention and from the drawing. Therein:

Figure 1:
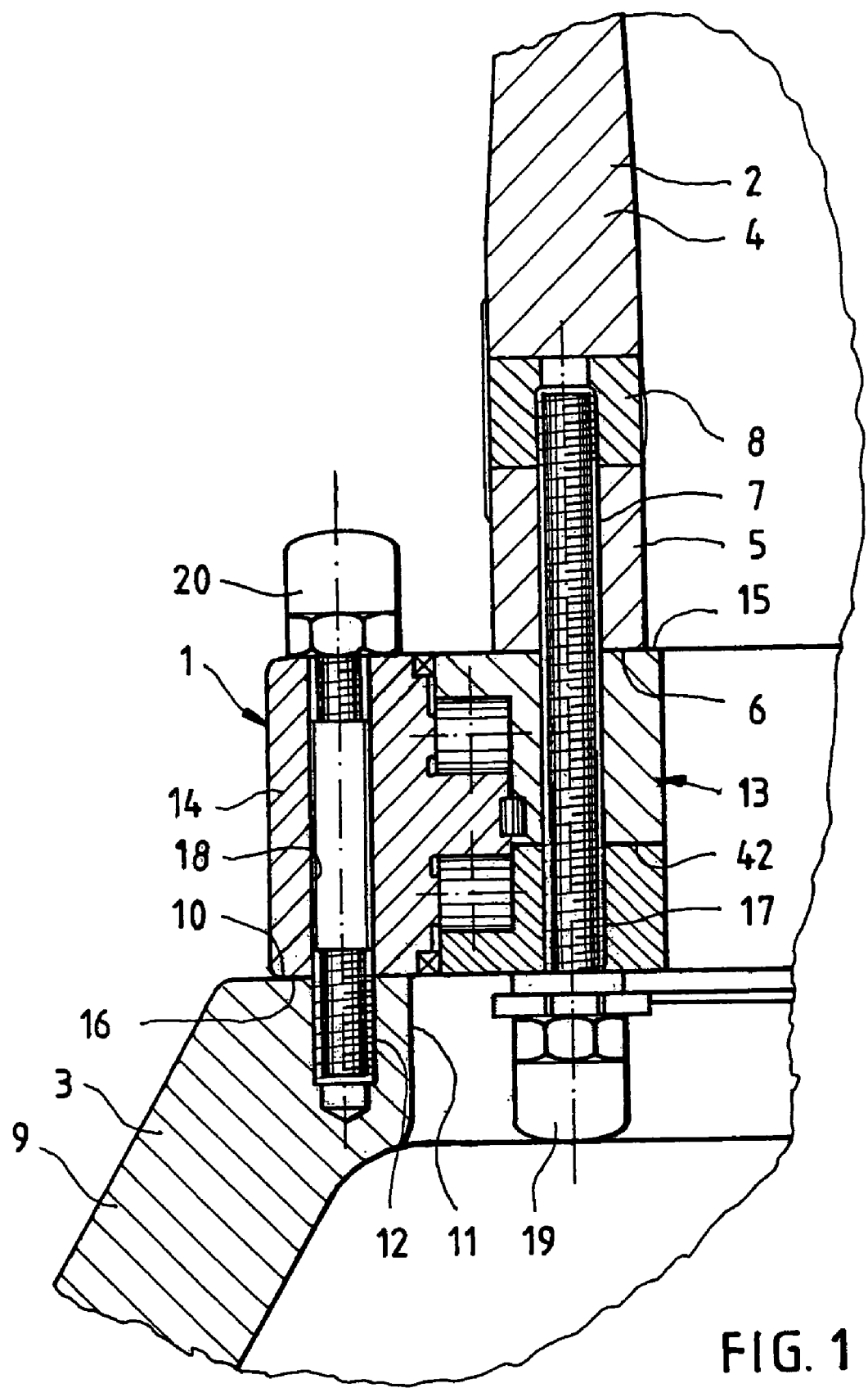
FIG. 1 is a section through a rotor blade unit according to the invention in the installed state, partially broken away.

A blade bearing 1 according to the invention finds application in wind power plants, where it serves to rotatably connect a rotor blade 2 to the rotor hub 3.

The rotor blade 2 is usually made of fiber composite and is patterned after a wing. To save on weight, the rotor blade 2 is configured as a lateral surface 4 surrounding an inner hollow space, which transitions at the rearward end 5 of the rotor blade 2 into a conformation presenting a cylindrical lateral surface with a diameter of, for example, about 2 m to 3 m. The planar rearward connecting surface 6 consequently is annular in outline. Provided in this connecting surface 6 are coronally arranged blind bores 7, each of which leads to a respective anchoring body 8 made of a hard material, for example iron, and implanted in the rotor blade 2. The blind bores 7 continue into the anchoring bodies 8 as internally threaded bores.

The rotor hub 3 is provided with a rigid salient 9 having a planar, annular connecting surface 10, one for each rotor blade 2, surrounding a circular opening 11. Also present in these connecting surfaces 10 are coronally arranged blind bores 12 provided with internal threading.

In the embodiment shown, the inner diameter of such a circular opening 11 is greater than the outer diameter of the rotor blade 2 at its rearward end 5. Between the two connecting surfaces 6, is a bearing unit 1 comprising two annular, mutually concentric and oppositely rotatable connecting elements 13, 14. One of the two mutually oppositely facing end faces 15, 16 of each of these connecting elements 13, 14 is in full-area contact with a respective connecting surface 6, 10.

To fixedly connect the connecting elements 13, 14 to the rotor blade 2, on the one side, and to the rotor hub 3, on the other side, coronally arranged continuous bores 17, 18 are provided respectively in the two connecting elements 13, 14. The continuous bores 17 of the inwardly disposed connecting element 13 agree in number, diameter and orientation with the blind bores 7 in connecting surface 6 of rotor blade 2, such that each continuous bore 17 is aligned with a respective blind bore 7 and permits the insertion of a stud bolt 19. If all the nuts are firmly tightened on the stud bolts 19, the inner ring 13 is firmly connected to the rearward end 5 of the rotor blade 2, specifically preferably such that the center axis of the inner ring 13 is aligned with the longitudinal axis of the rotor blade 2.

The continuous bores 18 of the outer connecting element 14 correspond agree [sic] in number, diameter and orientation with the blind bores 12 in connecting surface 10 of rotor hub 3, such that each continuous bore 18 is oriented in alignment with a respective blind bore 12 and allows a stud bolt 20 to be passed through. If all the nuts are firmly tightened on the stud bolts 20, the outer ring 14 is firmly connected to the salient 9 of rotor hub 3.

Figure 2:
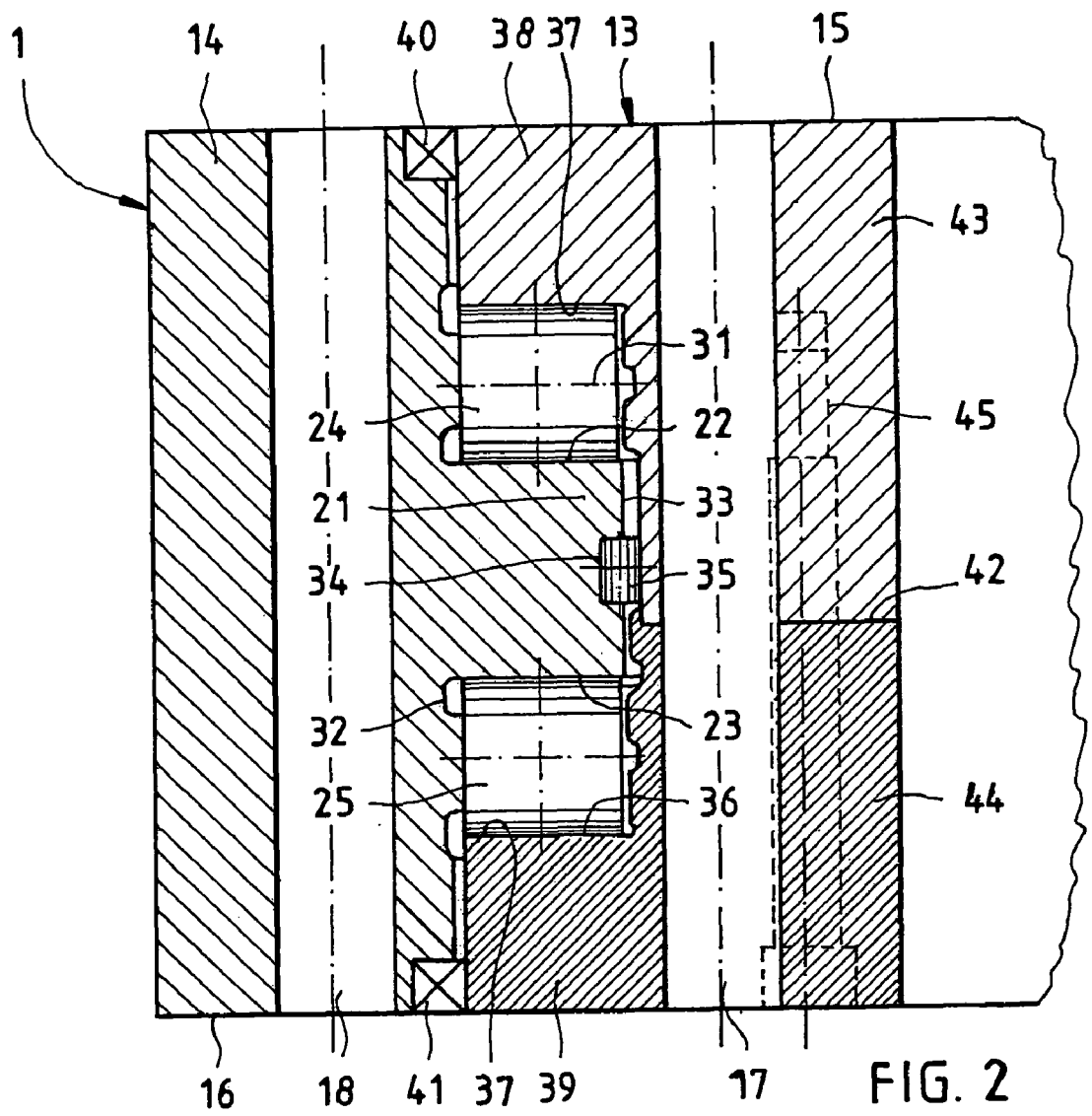
FIG. 2 shows the blade bearing unit from FIG. 1 in the removed state, also broken away.

The further details of the bearing unit 1 can be appreciated more easily from the representation of FIG. 2. Clearly visible is a circumferential, collar-shaped flange 21 of approximately rectangular cross section, disposed on the inner face of outer connecting element 14. The annular lateral faces 22, 23 of this flange 21 serve in each case as running surfaces for a respective row of rolling bodies 24, 25.

Figure 3:
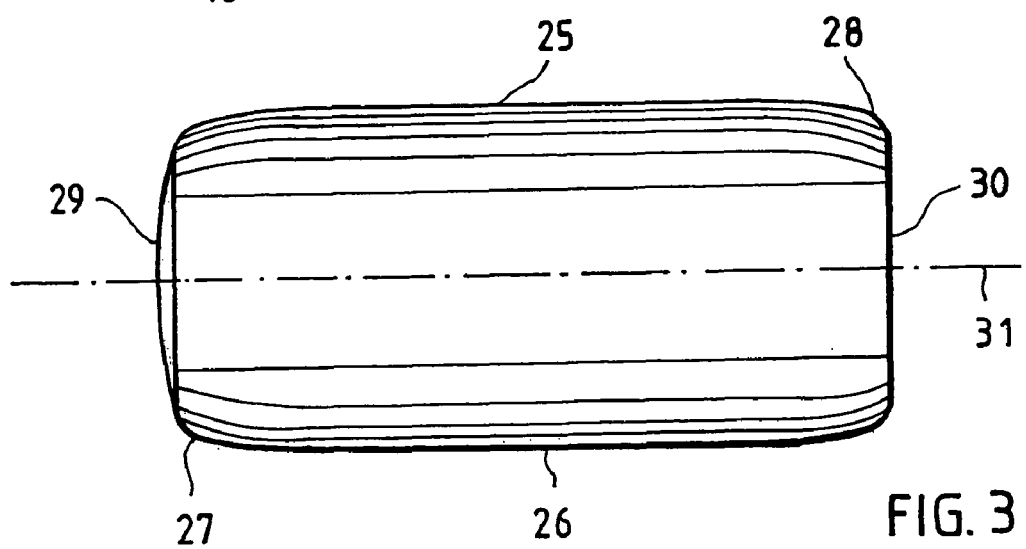
FIG. 3 is a view of the lateral surface of a rolling body of the blade bearing unit from FIGS. 1 and 2.

Such a rolling body 24, 25 is shown in isolation in FIG. 3. The roughly cylindrical shape can be seen, with a lateral surface 26 that is cylindrical in the middle region and the cambered, i.e. rounded, transitions 27, 28 to the end faces 29, 30. All the rolling bodies 24, 25 are oriented with their longitudinal axes 31 extending radially to the longitudinal axis of the rotor blade 2. Each rolling body 24, 25 therefore has a radially outwardly disposed end face 29 and a radially inwardly disposed end face 30. The outwardly disposed end face 29 in each case is outwardly convexly curved, namely in a dome shape. The radius of curvature of this dome-shaped boss is approximately equal to or slightly smaller than the inner diameter of the outer ring 14 laterally adjacent the flange 21 or axially offset therefrom. Thus, in the region of the circumference 27 of this end surface there is no contact with the inner face of the outer ring 14 and consequently also no friction. Additional circumferential recesses 32 can be provided for this purpose at the appropriate points on the outer ring 14.

The radial extent of the flange 21 relative to the axis of rotation of the bearing is approximately equal to the length of a rolling body 24, 25. Provided in the inwardly disposed end face 33 of the flange 21 is a running surface 34 in the form of a gutter-shaped recess for an additional bearing point 35, which preferably is also constructed in the manner of a cylindrical roller bearing. The width of this running surface 34 is smaller than the width of the running surfaces 22, 23 of the other two bearing points 24, 25.

The radially inwardly disposed connecting element 13 has on its outer side a circumambient depression 36 of approximately rectangular cross section. While the depth of this depression 36 is approximately equal to the length of a rolling body 24, 25, its width is the sum of the diameters of a rolling body 24 of the upper bearing point, which faces the rotor blade 2, and of a rolling body 25 of the lower bearing point, which faces the rotor hub 3, plus the axial extent of the flange 21 located therebetween. If this condition is adhered to as closely as possible, the rolling bodies 24, 25 roll without play between the lateral surfaces 22, 23 of the flange 21, on the one side, and the lateral surfaces 37 of the depression 36.

Each depression 36 is bounded laterally, hence in the axial direction, by a respective collar-shaped, radially outwardly projecting flange 38, 39. Located between each of the latter and the corresponding regions of the inner face of the outer ring is a respective annular sealing element 40, 41.

The inner ring 13 is divided into two halves, an upper 43 and a lower 44, along a central plane 42 perpendicularly intersected by the axis of rotation of the bearing. These halves 43, 44 are taken apart during the assembly of the blade bearing 1, and are put back together and fastened to each other by means of axially oriented screws 45 only after the rolling bodies 24, 25, 35 have been put in place. One of the two halves 43, 44 also contains the radially inwardly disposed running surface for the third bearing point 35.

The rolling bodies 24, 25, 35 of each rolling bearing are held in spaced relation by inserted spacer elements or by cages.

Rolling bodies 24, 25, whose longitudinal or rotational axes 31 are oriented radially to the axis of rotation of the bearing, serve primarily to transmit relatively high overturning moments or blade root bending moments imposed on the rotor blade 2 by the wind pressure. The smaller rolling bodies 35 transmit the wind pressure from the rotor blade 2 to the blade hub 3.

In this embodiment, a change in the rotor blade setting angle is effected for example by means of a hydraulic cylinder, which is articulated at one end to the rotor blade 2 and at the other end to the rotor hub 3. This cylinder is preferably constantly adjusted, so that the rolling bodies 24, 25, move continuously, thereby maintaining the lubricant film with which they are coated.

Figure 4:
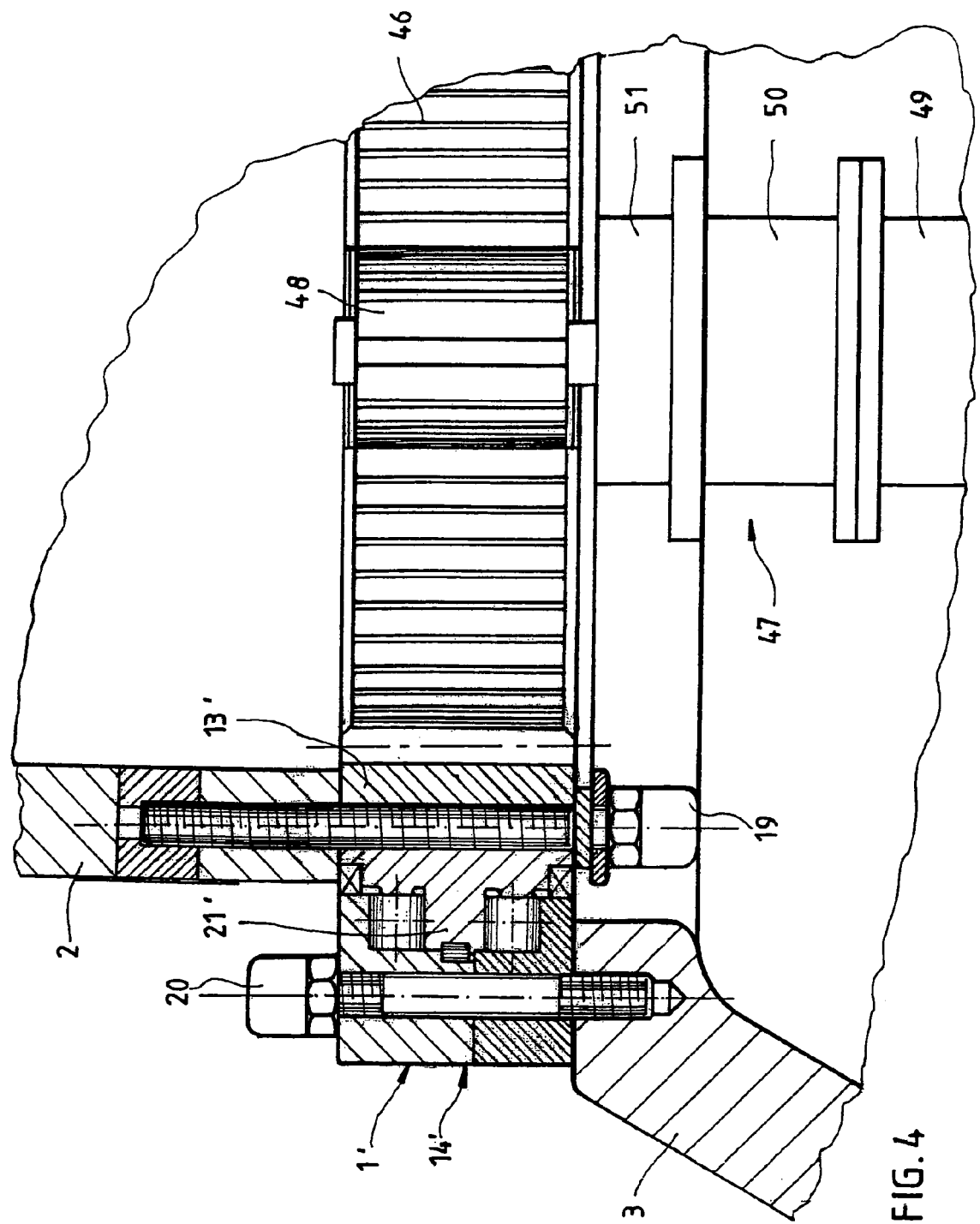
FIG. 4 is a view similar to that of FIG. 1 of another embodiment of the invention.
Figure 5:
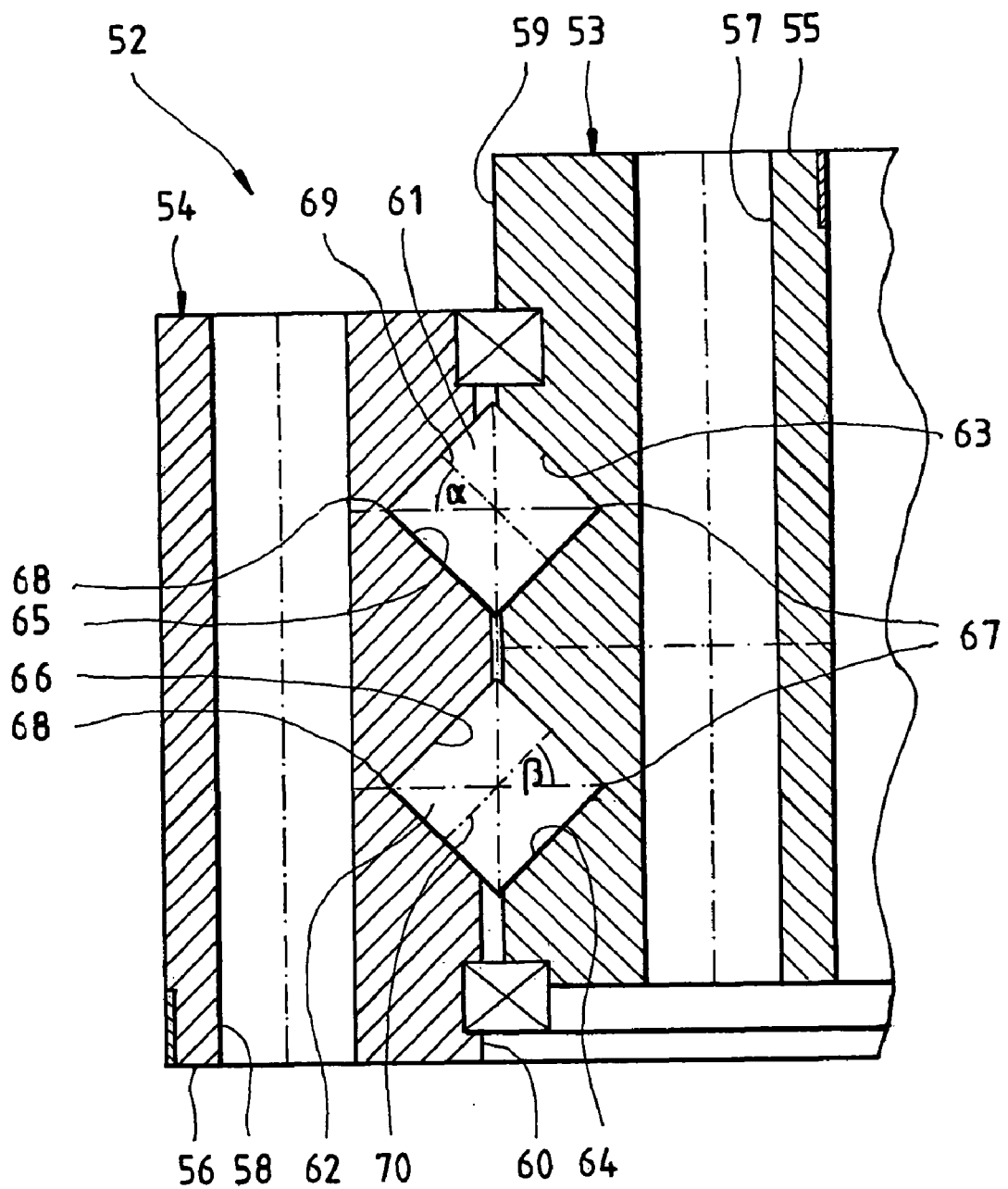
FIG. 5 is a representation similar to FIG. 2 of an additionally modified embodiment of the invention.

Depicted in FIG. 4 is another bearing unit 1', which has an alternative mechanism for changing the rotor blade setting angle. For this purpose, inner teeth 46 are provided on the inner face of the inner ring 13'. A drive unit 47 is fixed on the side nearer the housing, in the recess 11 of the salient 9 of rotor hub 3, while a driven pinion 48 meshes with said inner teeth 46. The inner ring 13' and with it the rotor blade 2 are thereby rotated with respect to the rotor hub 3. The drive unit 47 can be a motor 49, a downstream gear train 50 and a brake 51. Here again, the motor 49 is preferably constantly adjusted in order to maintain the lubricant film on the rolling bodies 24, 25, 35. So that the ring carrying the inner teeth 46 does not have to be broken down into multiple parts, which would create additional adjustment problems, in this embodiment 1' the subdivision 42' is to be provided in the outer ring 14' and not the inner ring 13'; the central flange 21' is therefore located on the outer face of the inner ring 13' instead of the inner face of the outer ring 14'.

The invention permits a number of additional modifications, as described below.

For example, the inner ring 13 can also be affixed to the rotor hub 3 and the outer ring 14 to the rotor blade 2. The rings 13, 14 can be mutually offset in the axial direction or can have different axial extents. Some or all of the continuous bores 17, 18 can be replaced with blind bores.

The outer ring 14 fastened to the hub 3 can comprise a depression 36 if the inner ring 13, conversely, has a flange 21.

The outer ring 14 could have outer teeth similar to those of the inner ring 13', 46 and be connected to the rotor blade 2 if the inner ring 13, conversely, is connected to the rotor hub 3.

Ring 44 could be connected to the rotor blade 2 if ring 43, conversely, served as a supporting surface for the nut of stud bolt 19.

Screws, particularly machine screws, could be used instead of the stud bolts 19, 20.

The blade bearing 52 for a wind power plant also comprises two annular, mutually concentric connecting elements 53, 54. One of every two mutually oppositely facing end faces 55, 56 of these connecting elements 53, 54 serves as a connection surface for a rotor blade, on the one side, and for the rotor hub, on the other. In the illustrated embodiment, each of these connection surfaces 55, 56 is elevated slightly above the adjacent end face of the respective other connecting element 54, 53.

Each connecting element 53, 54 is penetrated by a plurality of coronally arranged, continuous bores 57, 58, each of which is oriented perpendicular to the respective connecting surface 55, 58 and through which fastening screws and/or fastening bolts are passed.

Between the mutually confronting lateral surfaces 59, 60 or the two annular connecting elements 53, 54 is a radial distance or gap, such that the connecting elements 53, 54 are able to rotate freely in mutually opposite directions. This radial distance is kept constant by a multiplicity of roughly cylindrical rolling bodies 61, 62, each of which rolls between one of two raceways 63, 64 in the outer lateral surface 59 of radially inwardly disposed connecting element 53, on the one side, and one of two raceways 65, 66 in the inner lateral surface 60 of radially outwardly disposed connecting element 54. Said two raceways 63, 64; 65, 66 of a connecting element 53, 54 are radially offset from each other in the axial direction, i.e., parallel to the common axis of rotation of the bearing 52.

All the raceways 63-66 are in the form of respective circumambient grooves of roughly triangular cross section, preferably having the shape of an equilateral triangle with a right angle at the apex 67, 68. This apex 67, 68 corresponds to a circumambient chamfer that corresponds to the bottom of the particular groove 63-68.

The distances between the groove bottom 67, 68 of each of the two raceways 63, 64; 65, 66 of the same connecting element 53, 54 are equal in each of the two connecting elements 53, 54, so the rolling bodies 61, 62 can roll freely without jamming.

The length of a rolling body 61, 62 is preferably equal to its diameter, so the lateral surfaces of the rolling bodies 61, 62 are in linear contact with the particular running surfaces 63-66, but their end faces are not.

The axes of rotation 69 of the rolling bodies 61 of a raceway pair 63, 65 are preferably oriented so that they slope upward toward the outside, for example by an angle α of about 45° relative to the base plane of the bearing, which plane is perpendicularly intersected by the axis of rotation of the bearing 52; whereas the axes of rotation 70 of the rolling bodies 62 of the other raceway pair 64, 66 slope upward toward the inside, for example by an angle β of about 45° relative to the base plane of the bearing. In this connection, it is immaterial to the invention whether the rolling bodies 61, 62 are oriented in an X arrangement (in which the axes of rotation 69, 70 of all the rolling bodies 61, 62 are aligned with one another in an X shape in a main plane of the bearing, i.e., intersect in pairs radially within the bearing gap, comparable to ><), or in an O arrangement (in which the axes of rotation 69, 70 of all the rolling bodies 61, 62 are mutually oriented in an O shape in a main plane of the bearing, i.e., intersect in pairs radially outside the bearing, comparable to <>).

This arrangement makes it possible for the rolling bodies 61, 62 to transmit both axial forces between the connecting surfaces 55, 56 and radial forces between the mutually confronting lateral surfaces 59, 60 of the two connecting elements 53, 54.

The invention claimed is:

1. A wind power system comprising at least one elongated rotor blade (2) mounted on a hub (3) of a wind turbine by a bearing unit (1; 1'; 52) provided with two connecting elements (13, 14; 13', 14'; 53, 54) concentric with one another, one of the connecting elements (13) being rigidly connected to a back end (5) of the at least one elongated rotor blade (2), and the other connecting element (14) being rigidly connected to the rotor hub (3), the two connecting elements (13, 14; 13', 14'; 53, 54) having surface areas (59, 60) facing one another, between which there is a gap, such that the connecting elements (13, 14; 13', 14'; 53, 54) are adapted to turn freely with respect to one another, wherein each of the two connecting elements (13, 14; 13', 14'; 53, 54) is concentric with the other, and exhibits an annular configuration, each provided with attachment boreholes (17, 18; 57, 58) arranged in the form of a crown, for the purpose of connection to the hub (3), and to an annular connecting surface (6) at a back end of the rotor blade (2),
   a) wherein at each circumferential region (21, 36) in the gap between the two surface areas (59, 60) facing one another, an inner surface of the outer connecting element (14) and an outer surface of the radially inward connecting element (13) is provided with at least two races (22, 23; 36, 37; 63, 64) for rotating rollers (24, 25; 61, 62), each of which rolls between the race (63) of the one connecting element (13, 14; 13', 14'; 53, 54) and the race (64) of the other connecting element (13, 14; 13', 14'; 53, 54);
   b) the rotating rollers (24, 25; 61, 62) running in an annular gap between the two connecting elements (13, 14; 13', 14'; 53, 54) in a space sealed from surroundings;
   c) the at least two races (22, 23; 36, 37; 63, 64) being axially displaced from one another on each connecting element (13, 14; 13', 14'; 53, 54), each for a row of rotating rollers (24, 25; 61, 62); wherein
   d) the rollers (24, 25; 61, 62) of the two races axially displaced from one another are provided with a selected one of a cylindrical, conical, needle-shaped, and barrel-shaped configuration;
   e) wherein the rollers (24, 25; 61, 62) of the two races, axially displaced with respect to one another, are aligned such that their axes of rotation (31; 69, 70) intersect a longitudinal axis of the pertinent rotor blade (2) at an angle of 30°-90°;
   f) wherein there is provided a device for controlling the at least one elongated rotor blade such that the rotor blade is constantly or periodically turned around a longitudinal axis, at least during operation of the wind power system, even when a constant wind velocity does not make it necessary to adjust the blade, and
   g) wherein the at least one rotor blade (2) is formed as a lateral surface (4) surrounding an internal cavity, which lateral surface (4) approximates a shape of a lateral cylinder surface at the back end (5) of the rotor blade (2) and extends to a planar rearward connection surface (6) with annular disposed bores (7), which coincide with annular distributed through-bores (17, 18; 57, 58) in a connection element (13, 14; 13', 14'; 53, 54) with regard to number, diameter and orientation, such that the bores and through-bores are aligned with each other and permit insertion of a screw or a bolt into the connecting element (13, 14; 13', 14'; 53, 54), which screw or bolt is adapted to be screwed into the rotor blade (2), or is anchored therein.

2. The wind power system in accordance with claim 1, wherein the rollers (24, 25; 61, 62) of the two races of the rotor blade bearing unit (1; 1'; 52), axially displaced from one another, are aligned such that their axes of rotation (31; 69, 70) are generally radial and are generally perpendicular to the longitudinal axis of the rotor blade (2).

3. The wind power system in accordance with claim 2, wherein faces (15, 16; 55, 56) of the annular connecting elements (13, 14; 13', 14'; 53, 54) of the rotor blade bearing unit (1; 1'; 52) that face away from one another serve as connecting surfaces to the rotor hub (3) and to a rotor blade (2), directly or through intermediate elements.

4. The wind power system in accordance with claim 3, wherein each annular gap between the two connecting elements (13, 14; 13', 14'; 53, 54) of the rotor blade bearing unit (1, 1'; 52) is sealed off (40, 41) in a region between a roller race and a nearest adjacent connecting surface (15, 16; 55, 56).

5. The wind power system in accordance with claim 2, wherein there is a projecting encircling lip (21; 21') disposed on the outside of the connecting element (14; 13') of the rotor blade bearing unit (1; 1'; 52) facing another connecting element (13; 14') of the rotor blade bearing unit (1; 1'; 52).

6. The wind power system in accordance with claim 5, wherein two annular face surfaces of the lip (21; 21') serve as race surfaces for the generally cylindrical rollers (24, 25; 61, 62) of each row of rollers.

7. The wind power system in accordance with claim 6, wherein the races of the rotor blade bearing unit (1; 1'; 52) for the generally cylindrical rollers (24, 25; 61, 62) extend along generally flat annular surfaces through which the longitudinal axis of the rotor blade (2) passes generally perpendicularly.

8. The wind power system in accordance with claim 2, wherein a third bearing point (35) on the rotor blade bearing unit (1; 1'; 52) is disposed between two surface areas (33) of the two connecting elements (13, 14; 13', 14'; 53, 54) that face one another.

9. The wind power system in accordance with claim 8, wherein the third bearing point (35) is disposed between the two races for generally cylindrical rollers (24, 25; 61, 62), which are aligned such that their axes of rotation (31, 69, 70) are not parallel to the longitudinal axis of the rotor blade (2).

10. The wind power system in accordance with claim 8, wherein the third bearing point (35) of the rotor blade bearing unit (1; 1'; 52) comprises a roller bearing.

11. The wind power system in accordance with claim 10, wherein the axis of rotation of the rollers of the third bearing point (35) is oriented generally parallel to the longitudinal axis of the rotor blade (2).

12. The wind power system in accordance with claim 10, wherein a roller (35) of the third bearing point is provided with a smaller volume than a roller (24, 25; 61, 62) whose axis of rotation (31; 69, 70) is not oriented parallel to the longitudinal axis of the rotor blade (2).

13. The wind power system in accordance with claim 8, wherein the third bearing point (35) of the rotor blade bearing unit (1; 1'; 52) comprises a friction bearing.

14. The wind power system in accordance with claim 8, wherein an effective width of the race (22, 23, 37) of the rotor blade bearing unit (1; 1'; 52) that comes into contact with the roller (24, 25; 61, 62) whose axis of rotation (31; 69, 70) is not aligned parallel to the longitudinal axis of a rotor blade (2), is greater than an effective width of a race or slip bearing surface (34) of the bearing point (35) that is disposed between the two surface areas (33) of the two connecting elements (13, 14; 13', 14'; 53, 54) facing one another.

15. The wind power system in accordance with claim 2, wherein a connecting element (13; 14') of a rotor blade bearing unit (1; 1'; 52) is divided along a plane (42) oriented generally perpendicularly to a longitudinal axis of the rotor blade (2).

16. The wind power system in accordance with claim 2, wherein the transition region(s) (27, 28) between the surface area and one or both of the faces of the rollers (24, 25; 61, 62) whose axes of rotation (31; 69, 70) are not aligned parallel to the longitudinal axis of the rotor blade (2) is/are cambered.

17. The wind power system in accordance with claim 2, wherein the rollers (24, 25; 61, 62) of a rotor blade bearing unit (1; 1'; 52) having axes of rotation (31; 69, 70) not aligned parallel to the longitudinal axis of a rotor blade (2) are hollow.

18. The wind power system in accordance with claim 17, wherein adjacent hollow rollers (24, 25; 61, 62) are connected to one another by connecting elements, said elements having faces extending into hollow spaces of the rollers (24, 25; 61, 62).

19. The wind power system in accordance with claim 18, wherein the connecting elements are mutually connected to at least one cage.

20. The wind power system in accordance with claim 2, wherein cross sections of the races of a rotor blade bearing unit (1; 1'; 52) provided for the introduction of rollers (24, 25; 61, 62) in the unloaded, unassembled state of the bearing unit (1; 1' 52) do not conform to the longitudinal section of a roller (24, 25; 61, 62) to be introduced therein.

21. The wind power system in accordance with claim 2, wherein an axial extent of the cross section of the races of the rotor blade bearing unit (1; 1'; 52) provided for the introduction of the rollers (24, 25; 61, 62) is smaller at least in areas than a diameter of a corresponding roller (24, 25; 61, 62).

22. The wind power system in accordance with claim 2, wherein the rollers (24, 25; 61, 62) of a rotor blade bearing unit (1; 1'; 52) whose axes of rotation (31; 69, 70) are not aligned parallel to a longitudinal axis of a rotor blade (2), are provided with at least one cup-shaped cambered face (29).

23. The wind power system in accordance with claim 22, wherein the radius of the camber of the cup-shaped face (29) conforms generally to an inside radius of an outer ring (14).

24. The wind power system in accordance with claim 2, wherein a spacer is disposed between all adjacent rollers (24, 25; 61, 62) of a rotor blade bearing unit (1; 1'; 52), whose radial longitudinal extent is equal to or smaller than the radial longitudinal section of a roller (24, 25; 61, 62).

25. The wind power system in accordance with claim 2, wherein no teeth are provided on any connecting element (13, 14; 53, 54) of a rotor blade bearing unit (1; 1'; 52).

26. The wind power system in accordance with claim 2, wherein teeth (46) are provided on one connecting element (13', 14') of a rotor blade bearing unit (1; 1'; 52).

27. The wind power system in accordance with claim 26, wherein the teeth (46) are provided on an inside of the inner ring (13') of the rotor blade bearing unit (1; 1'; 52).

28. A method for operating a wind power system with at least one elongated rotor blade mounted on a hub (3) of a wind turbine by means of a bearing unit (1; 1'; 52) provided with two connecting elements (13, 14; 13', 14'; 53, 54) concentric with one another, one of the connecting elements (13) being rigidly connected to a back end (5) of the at least one elongated rotor blade (2), and the other connecting element (14) being rigidly connected to the rotor hub (3), with the two connecting elements (13, 14; 13', 14'; 53, 54) having surface areas (59, 60) facing one another, between which there is a gap, such that the connecting elements (13, 14; 13', 14'; 53, 54) turn freely with respect to one another, wherein each of the two connecting elements (13, 14; 13', 14'; 53, 54) exhibits an annular configuration, with attachment boreholes (17, 18; 57, 58) arranged in the form of a crown, for connection to the hub (3) and to an annular connecting surface (6) at the back end of the rotor blade (2), a) the bearing unit (1; 1'; 52) being provided with at least two races (22, 23; 36, 37; 63, 64) axially displaced from one another in a gap between the two surface areas (59, 60) facing one another on each connecting element (13, 14; 13', 14'; 53, 54), each for a row of rotating rollers (24, 25, 61, 62), each of the rollers adapted to roll between a race (63) of the one connecting element (13, 14; 13', 14'; 53, 54), and the race (64) of the other connecting element (13, 14; 13', 14'; 53, 54), b) the rotating rollers (24, 25; 61, 62) running in an annular gap between the two connecting elements (13, 14; 13', 14'; 53, 54) in a space sealed off from surroundings;

c) the at least two races (22, 23; 36, 37; 63, 64) being axially displaced from one another on each connecting element (13, 14; 13', 14'; 53, 54), each race for a row of rotating rollers (24, 25; 61, 62), wherein d) the bearing unit (1; 1'; 52) is adapted to mount at least one rotor blade with the rollers (24, 25; 61, 62) adapted to run along the two races and provided with a selected one of generally cylindrical, conical, needle-shaped, and barrel-shaped configuration;

e) wherein the rollers (24, 25; 61, 62) of the two races, axially displaced with respect to one another, are aligned such that their axes of rotation (31; 69, 70) intersect a longitudinal axis of a rotor blade (2) at an angle of 30°-90°; the method comprising the steps of f) controlling the at least one elongated rotor blade such that it is turned around its longitudinal axis at least during operation of the wind power system even when a constant wind velocity does not make it necessary to adjust the blade, and g) wherein the at least one rotor blade (2) is formed as a lateral surface (4) surrounding an internal cavity, which lateral surface (4) approximates a shape of a lateral cylinder surface at a rearward end (5) of the rotor blade (2) and extends to a planar rearward connection surface (6) with annular disposed bores (7) which coincide with annular distributed through-bores (17, 18; 57, 58) in a connection element (13, 14; 13', 14'; 53, 54) with regard to number, diameter and orientation, such that the bores and through-bores are aligned with each other, whereby a screw or a bolt is adapted to be inserted into the connection element (13, 14; 13', 14'; 53, 54), the screw or bolt being anchored in the rotor blade.

29. The method in accordance with claim 28, wherein the adjustment of an angle of attack of a rotor blade (2) is governed by an angular position of the wind turbine.

30. The method in accordance with claim 28, wherein a period of turning of the rotor blade (2) conforms to the period of revolution of the wind turbine, provided the wind turbine does not drop below a selected lower limit.

31. The method in accordance with claim 28, wherein a period of turning of a rotor blade (2) is kept generally constant when the period of revolution of the wind turbine drops below a selected lower limit.

32. The method in accordance with claim 28, wherein the periodic turning motion oscillates between two extreme values.

33. The method in accordance with claim 32, wherein the amplitude of the turning of a rotor blade (2) is governed by differing wind velocities above ground that act on the rotor blade generally at its uppermost and lowest position, either by reference to measurement of different wind velocities or by reference to a control formula based on an estimation of different wind velocities.

34. The method in accordance with claim 33, wherein the amplitude of the turning of the rotor blade (2) during operation does not fall below a selected limit.

35. The method in accordance with claim 31, wherein a mean between extreme values of the turning of a rotor blade (2) depends on wind velocity.

36. Wind power system comprising at least one elongated rotor blade mounted on a hub (3) of a wind turbine by means of a bearing unit (1; 1'; 52) provided with two connecting elements (13, 14; 13', 14'; 53, 54) concentric with one another, one of the connecting elements (13) being rigidly connected to a back end (5) of the at least one elongated rotor blade, the other connecting element (14) being rigidly connected to the rotor hub (3), with the two connecting elements (13, 14; 13', 14'; 53, 54) having surface areas (59, 60) facing one another, between which there is a gap, such that the connecting elements (13, 14; 13', 14'; 53, 54) turn freely with respect to one another, wherein each of the two connecting elements (13, 14; 13', 14'; 53, 54) exhibits an annular configuration, each provided with attachment boreholes (17, 18; 57, 58) arranged in the form of a crown, for connection to the hub (3) and to an annular connecting surface (6) at a back end of said rotor blade (2);

a) wherein at each circumferential region (21, 36) in the gap between the two surface areas (59, 60), an inner surface of the outer connecting element (14) and an outer surface of the radially inward connecting element (13) is provided with at least two races (22, 23; 36, 37; 63, 64) for rotating rollers (24, 25; 61, 62) which roll between the race (63) of the one connecting element (13, 14; 13', 14'; 53, 54) and the race (64) of the other connecting element (13, 14; 13', 14'; 53, 54);

b) the rotating rollers (24, 25; 61, 62) running in an annular gap between the two connecting elements (13, 14; 13', 14'; 53, 54) in a space sealed off from surroundings;

c) the at least two races (22, 23; 36, 37; 63, 64) being axially displaced from one another on each connecting element (13, 14; 13', 14'; 53, 54), each for a row of the rotating rollers (24, 25; 61, 62), wherein d) the rollers (24, 25; 61, 62) of the two races are displaced from one another and are provided with a selected one of a cylindrical, a conical, a needle-shaped, and barrel-shaped configuration; wherein e) the rollers (24, 25; 61, 62) of the two races, axially displaced with respect to one another, are aligned such that their axes of rotation (31; 69, 70) intersect a longitudinal axis of said rotor blade (2) at an angle of 30°-90°; wherein f) there is provided means for controlling said at least one elongated rotor blade such that said blade is constantly or periodically turned around its longitudinal axis, at least during operation of the wind power system, even when a constant wind velocity does not make it necessary to adjust said blade; wherein g) said at least one rotor blade (2) is formed as a lateral surface (4) surrounding an internal cavity, the lateral surface (4) having a configuration generally constituting a lateral cylinder surface at a rearward end (5) of said rotor blade (2) and extends to a planar rearward connection surface (6) with annular disposed bores (7), which coincide with annular distributed through-bores (17, 18; 57, 58) in a connecting element (13, 14; 13', 14'; 53, 54) with regard to number, diameter and orientation, such that the bores and through-bores are aligned with each other and permit insertion of a screw or a bolt into the connecting element (13, 14; 13', 14'; 53, 54), which screw or bolt is adapted to be screwed into said rotor blade (2) or is otherwise anchored therein, h) wherein each of the annular disposed bores (7) in the planar rearward connection surface (6) of said rotor blade (2) leads to a respective anchoring body (8) implanted in said rotor blade (2) and extends into the anchoring body (8) as an internally threaded bore.

\* \* \* \* \*